(No Model.)
J. B. ABERNATHY.
Bird Cage.
No. 242,575.  Patented June 7, 1881.
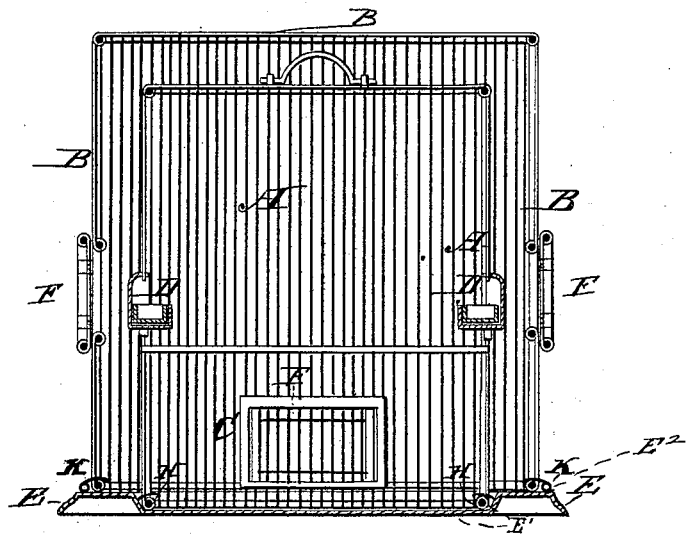
WITNESSES:
INVENTOR:
ATTORNEYS.

UNITED STATES PATENT OFFICE.

JOHN B. ABERNATHY, OF COVINGTON, KENTUCKY.

BIRD-CAGE.

SPECIFICATION forming part of Letters Patent No. 242,575, dated June 7, 1881.

Application filed December 28, 1880. (No model.)

*To all whom it may concern:*

Be it known that I, JOHN B. ABERNATHY, of Covington, in the county of Kenton and State of Kentucky, have invented a new and Improved Cage for Birds and other Animals, of which the following is a specification.

The object of my invention is to protect the animal confined in cages from suffering by external violence and from being preyed upon by larger animals.

In the accompanying drawing is shown a cross-sectional elevation of my improved cage, showing the outer cage independent of the inner cage.

Similar letters of reference indicate corresponding parts.

The inner cage, A, as well as the outer cage, B, is made with wires or bars and without bottoms, in the ordinary manner, and may have any suitable horizontal section. It is provided with a door, C, and with cups D, for food and water like all ordinary bird-cages. This inner cage, A, is surrounded by a cage, B, which is slightly larger than the cage A, and is of such size that the bars of the inner cage, A, will fit inside of this cage B. The cage B is entirely independent of the cage A, and the latter may be taken out of the former whenever desired.

The outer cage, B, is provided with the doors F, corresponding to the door C, and the cups D of the cage A. A cage with double gratings on all sides but the bottom is thus formed.

The base E is provided with a concavity, E', to receive the lower edges of the sides of cage A, hooks H H, for holding it to the inner cage, A, a raised surrounding platform, E², and hooks K K, for holding it to the outer cage, B. In this case also both the inner and outer gratings are provided with corresponding doors, and the inner one with food-cups.

A cage made as herein shown and described will protect animals confined therein more safely than the cages made heretofore, and the escape of the animal will be rendered much more difficult.

Having thus described my invention, I claim as new and desire to secure by Letters Patent—

The combination, with two independent cages, A B, one within the other and each without a bottom, of the single bottom or base E, having a concavity, E', in which rests the lower edges of the sides of the inner cage, and a surrounding platform, E², by which the surrounding cage is supported, said base being connected to each cage by a detachable fastening, substantially as described.

JOHN BLACKSTONE ABERNATHY.

Witnesses:
JAMES T. JOHNSON,
E. L. DWELL.